(No Model.)
G. H. BEAUMONT.
NUT LOCK.
No. 541,825. Patented July 2, 1895.
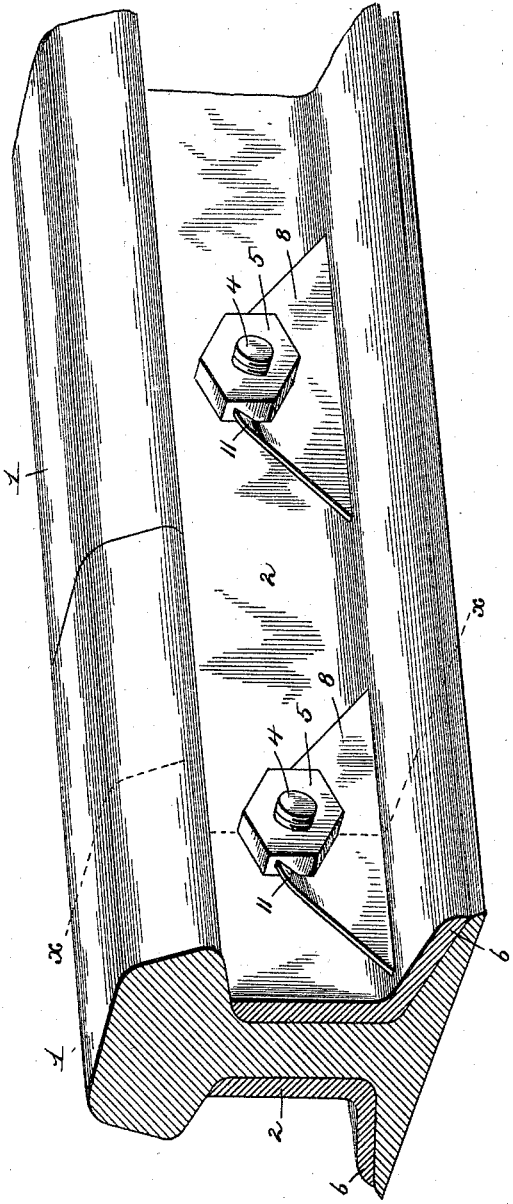
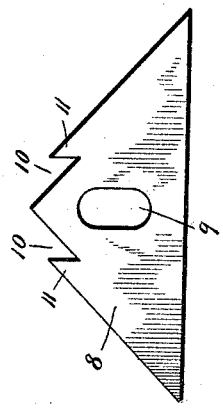
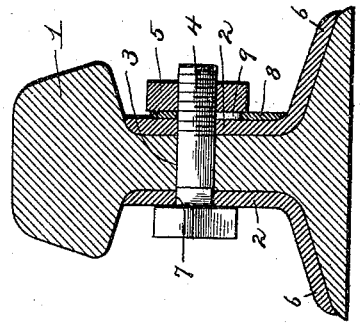
Witnesses
Harry L. Ames
D. P. Holhaupter
Inventor
George H. Beaumont.
By his Attorneys,
C. A. Snow & Co.

UNITED STATES PATENT OFFICE.

GEORGE H. BEAUMONT, OF QUINCY, ILLINOIS.

NUT-LOCK.

SPECIFICATION forming part of Letters Patent No. 541,825, dated July 2, 1895.

Application filed December 24, 1894. Serial No. 532,843. (No model.)

*To all whom it may concern:*

Be it known that I, GEORGE H. BEAUMONT, a citizen of the United States, residing at Quincy, in the county of Adams and State of Illinois, have invented a new and useful Nut-Lock, of which the following is a specification.

This invention relates to nut locks; and it has for its object to provide a simple, cheap, and efficient nut lock having simple and efficient means for positively locking any shaped nut on a bolt without alteration of the nut or bolt.

To this end the main and primary object of the present invention is to construct a nut lock particularly available for use in connection with rail joints, but which is equally as well adapted for locking the nuts of bolts wherever required.

With these and other objects in view, which will readily appear as the nature of the invention is better understood, the same consists in the novel construction, combination, and arrangement of parts hereinafter more fully described, illustrated, and claimed.

In the drawings, Figure 1 is a perspective view of a rail joint showing my improved nut lock in its applied position. Fig. 2 is a transverse sectional view on the line *x x* of Fig. 1. Fig. 3 is a detail plan view of the improved nut lock.

Referring to the accompanying drawings, 1—1 designate the adjacent rail ends of a rail joint, at both sides of which rails are placed the usual fish plates 2, and the rails and fish plates are provided with the usual aligned bolt openings 3, to receive the bolts 4, on one end of which bolts are fitted the usual nuts 5, which may be either square, hexagonal, octagonal, or other polygonal shape.

In most rail joints the fish plates 2, are made of angle iron and are therefore provided with lower flanged edges 6, fitting the flanges of the rails, and the bolts 3, that are ordinarily employed are usually provided next to the heads thereof with squared or shouldered portions 7, that fit in corresponding openings in the fish plate to provide an arrangement which forms a lock for the bolt to prevent the same from turning in the bolt openings 3, and when rail joints are provided with bolts of this character, it will be obvious that when combined with the nut lock contemplated by the present invention, a loosening of the nut is absolutely impossible.

In connection with the nuts 5, of the bolts 4, the present invention contemplates the use of a metallic washer plate 8. The washer plate 8, is made of any suitable non-resilient metal that is capable of being bent and retaining its bent position, and the said plate is preferably made triangular in shape so that the lower base edge thereof will rest directly on top of the flange 6, at the lower edge of the fish plate or bar 2. The triangular washer plate 8, is provided with an elongated vertically disposed bolt slot or opening 9, that is adapted to receive the threaded end of the bolt on which is mounted the nut, and by reason of the length and disposition of the slot or opening 9, it will be obvious that the washer plate can be applied to any rail joint, and at the same time have its lower base edge rest on the flange of the fish plate or bar, and this adaptation to all rail joints is not possible with other nut locks of the same character, for the reason that the space between the bolts and the flanged lower edges of the fish plate is not always the same, but varies.

The nut lock washer plate 8, is further provided at both sides of its upper angle or apex with angular cut away portions or notches 10, that form triangular side locking tongues or points 11, either of which tongues or points 11, is adapted to be bent out from the plane of the plate 8, against one side of the nut to provide for locking the same on the bolt. By reason of the specific shape and disposition of the tongues or points 11, it will be noted that when one of the same is pressed out by any pointed instrument, such tongue or point forms a brace whose edge extends beyond the surface of the washer plate parallel with one side of the nut, and thereby prevents the nut from working loose, as the lower base edge of the washer plate rests on the flange or projection of the fish plate or bar.

It will be understood that the washer plate 8, is reversible in character, and that only one of the tongues or points 11, is employed to fasten or lock the nut on the bolt, and in the event of one of the tongues or points becoming broken it is simply necessary to reverse the position of the washer plate to bring the unbroken point or tongue at the proper side of the nut for locking the same. To unlock the nut, the locking tongue or point 11, that is bent out, is hammered down flush with the surface of the washer plate to admit of an unscrewing of the nut.

Changes in the form, proportion and the minor details of construction may be resorted to without departing from the principle or sacrificing any of the advantages of this invention, and at this point it is to be noted that the locking tongues or points 11, are formed without making any slits in the washer plate as has heretofore been done, but the tongues are cut out directly from the washer plate and thereby obviate the disadvantages attendant upon slitting the plate, it being understood that slits in a metal plate have a tendency to weaken the portions of the plate that are formed by the slits, inasmuch as the slitting tool generally spreads the metal and causes a flaw at the base of the slit.

Having thus described the invention, what is claimed, and desired to be secured by Letters Patent, is—

A nut lock for rail joints consisting of a reversible triangularly-shaped non-resilient washer-plate provided with a straight lower edge, and an elongated vertically disposed bolt slot or opening adapted to fit over a bolt and permitting an adjustment of the washer plate to bring the straight lower edge thereof against the flange of the fish plate of the rail joint, said reversible washer plate being further provided at both sides of its upper angle or apex with angular cut-away portions or notches forming opposite triangular side locking tongues or points, either of which tongues or points is adapted to be bent out from the plane of the plate against the side of the nut, substantially as set forth.

In testimony that I claim the foregoing as my own I have hereto affixed my signature in the presence of two witnesses.

GEORGE H. BEAUMONT.

Witnesses:
 E. B. IRWIN,
 GEO. HARRELL.